UNITED STATES PATENT OFFICE.

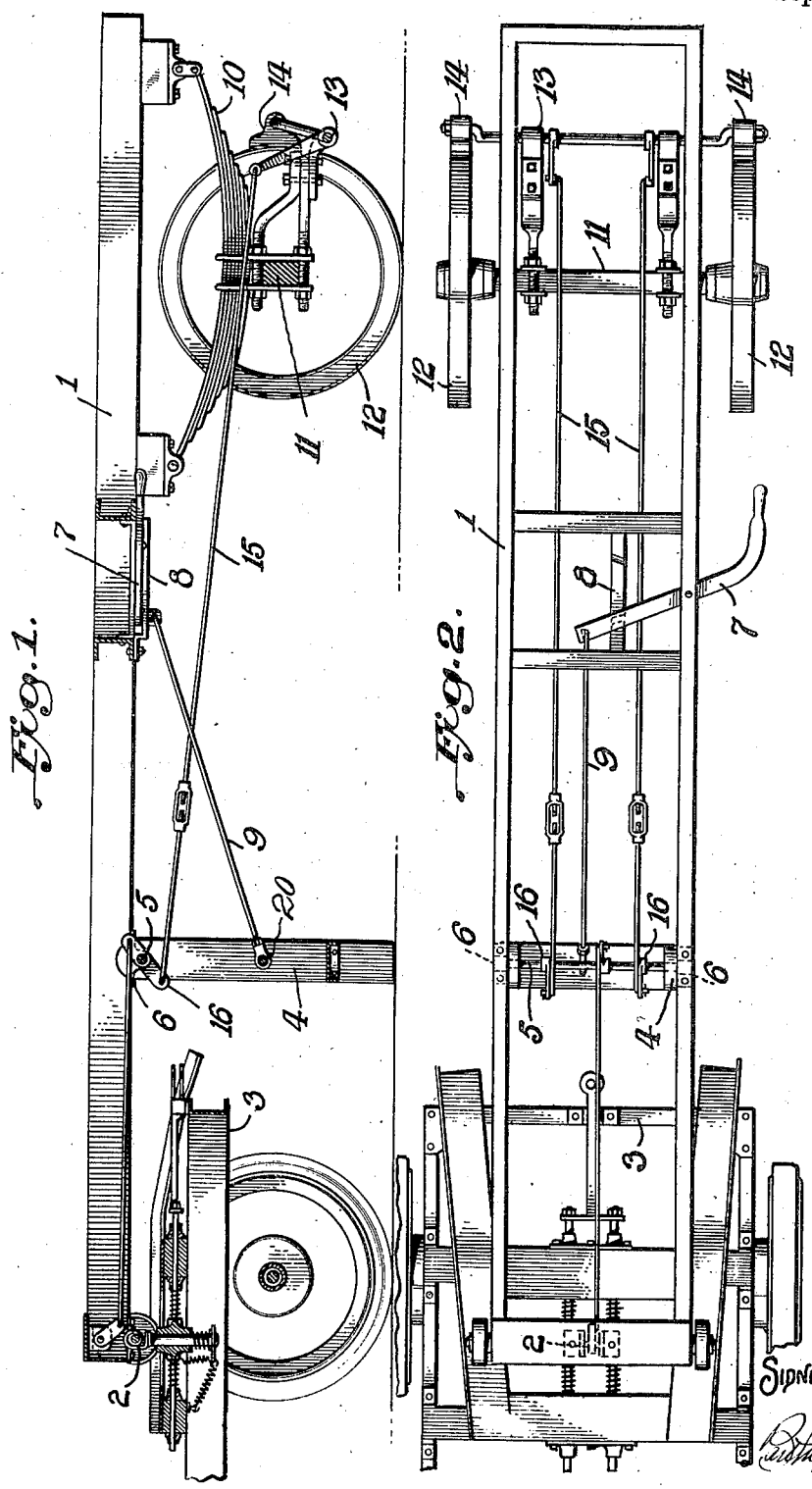

SIDNEY B. WINN, OF LAPEER, MICHIGAN, ASSIGNOR TO LAPEER TRACTOR-TRUCK CO., OF LAPEER, MICHIGAN, A CORPORATION OF MICHIGAN.

TRAILER.

1,316,661.  Specification of Letters Patent.  Patented Sept. 23, 1919.

Application filed January 5, 1918. Serial No. 210,414.

*To all whom it may concern:*

Be it known that I, SIDNEY B. WINN, a citizen of the United States of America, residing at Lapeer, in the county of Lapeer and State of Michigan, have invented certain new and useful Improvements in Trailers, of which the following is a specification, reference being had therein to the accompanying drawings.

In my Patent No. 1,249,705 dated Dec. 11, 1917, and in my companion application of even date Serial No. 210,414 there is disclosed a truck adapted to be connected relatively to a trailer, the trailer being provided with a brake mechanism and a rest member or leg adapted for controlling the brake mechanism and the connecting and disconnecting means between the truck and trailer.

The truck includes a novel track, draft appliance and coupling device, as brought out in my patent and the forward end of the trailer includes means whereby the truck can be easily and quickly connected and disconnected relatively thereto and when connected has a fifth wheel action, so that the trailer may be manipulated just as though propelled by a power plant carried thereby.

This invention relates to that portion of my companion application disclosing the trailer as having a brake mechanism controlled by the leg or rest member irrespective of the nature of the coupling means between the trailer and the truck. The combination of these two features, one controlled by the other, will be hereinafter referred to and then claimed, and reference will now be had to the drawings, wherein—

Figure 1 is a longitudinal sectional view of the trailer relatively to a portion of a truck;

Fig. 2 is a plan of the same.

The trailer comprises a frame 1 adapted to have the forward end thereof connected, as generally denoted at 2, to the rear end of a truck or similar vehicle and when it is disconnected relatively to the truck 3, the forward end of the trailer frame is adapted to be supported by a pivoted leg or rest member 4. This leg or rest member is fixed on a rock shaft 5, journaled in bearings 6 carried by the sides of the frame 1, and said leg or rest member may be raised and lowered by a device carried by the trailer frame and connected to said leg or rest member. The device comprises a horizontal pivoted lever 7 having the outer end thereof projecting from the side of the trailer frame and the inner end thereof extending through a notched guide and connected to a transverse member 20 of the leg or rest member 4 by a rod 9. The pivoted lever 7 may be set in engagement with the guide 8 so as to hold the leg or rest member in an adjusted position.

The rear end of the trailer frame 1 is supported on springs 10 carried by an axle 11 and wheels 12. The axle 11 supports a conventional form of brake rigging 13 having brake shoes or bands 14 movable relative to the wheels 12, so that said wheels may be locked against rotation or released for rotation. The brake mechanism is actuated through the medium of rods 15 extending forwardly and connected to cranks 16 on the rock shaft 5.

By lowering the leg or rest member 4 to an active position, the forward end of the trailer frame will be supported and the brakes will be set so that the trailer cannot accidentally move when being loaded or unloaded. When a truck supports the forward end of the trailer, the leg or rest member must be raised and when swung to an inactive position the brakes are released thus allowing the truck to move the trailer.

One embodiment of my invention has been illustrated, but it is to be understood that the structural elements are susceptible to such variations and modifications as fall within the scope of the appended claims.

What I claim is:—

1. A trailer comprising a frame, a rest member contiguous to the forward end thereof, wheels supporting the rear end of said frame, a brake mechanism for said wheels and actuated from said rest member, and means supported centrally of said frame and operatable at a point between said rest member and the wheels of said frame, adapted for adjusting said rest member.

2. A trailer comprising a frame, a pivoted rest member contiguous to the forward end thereof, wheels supporting the rear end of said frame, a brake mechanism for said wheels and adapted to be operated by said rest member, and a horizontally disposed lever connected to said rest member and projecting from said frame adapted for adjusting said rest member.

3. A trailer comprising a frame, a rock shaft carried thereby, a rest member having its upper ends mounted on said rock shaft against the inner side walls of said frame and adapted for supporting the forward end of said frame, wheels supporting the rear end of said frame, a brake mechanism for said wheels adapted to be actuated from said rock shaft, and means carried by said frame between said rock shaft and the wheels of said frame adapted for rocking said shaft through the medium of said rest member.

In testimony whereof I affix my signature in the presence of two witnesses.

SIDNEY B. WINN.

Witnesses:
  E. E. MIX,
  G. R. BUCK.